Figure 1:
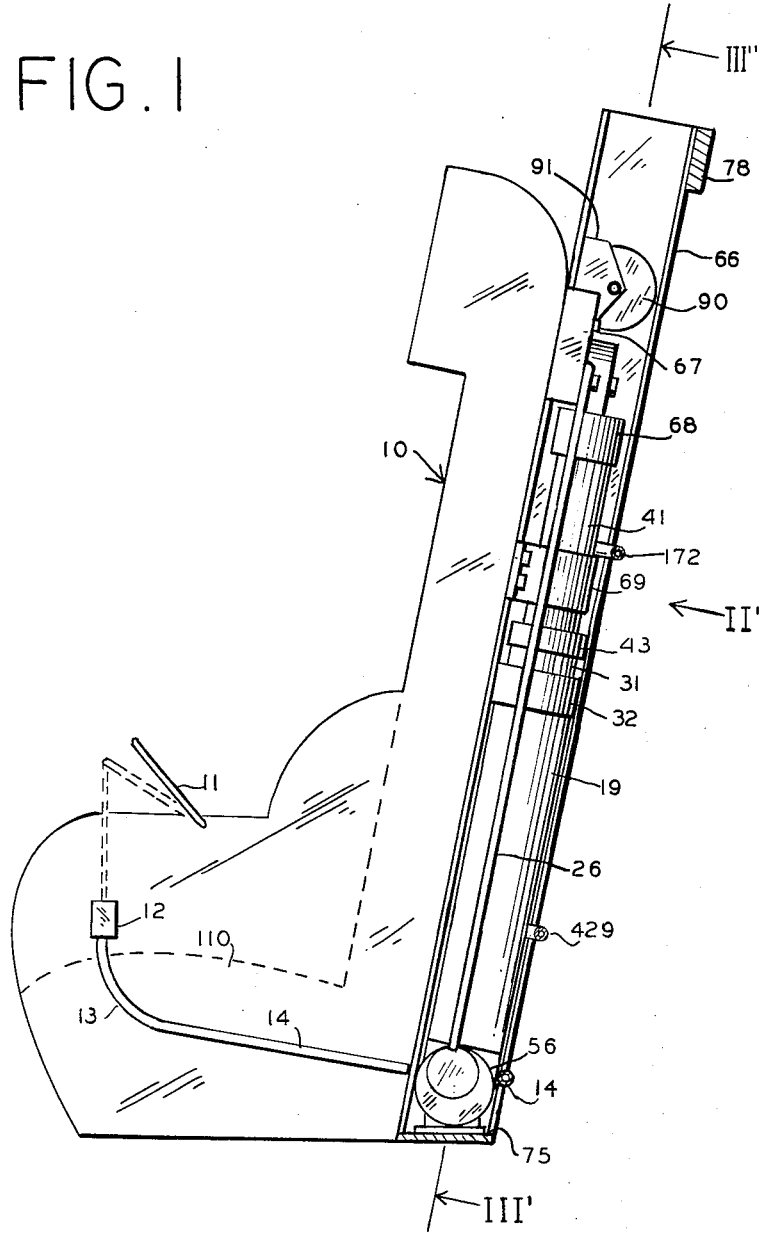

April 28, 1964     C. G. FRANKS     3,130,947
EJECTION SEAT CATAPULT

Filed Nov. 30, 1960     5 Sheets-Sheet 1

CHAS. GLEN FRANKS
*INVENTOR.*

BY *Ely Silverman*

ATTORNEY

April 28, 1964
C. G. FRANKS
3,130,947
EJECTION SEAT CATAPULT
Filed Nov. 30, 1960
5 Sheets-Sheet 2
FIG. II
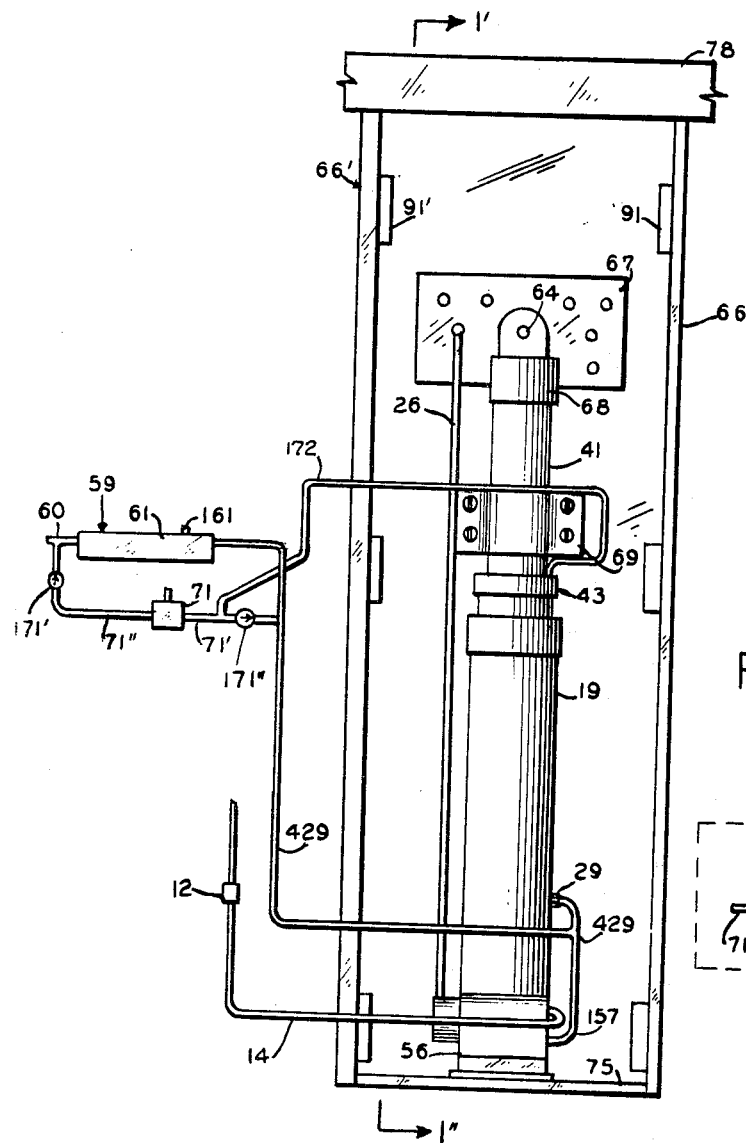
FIG. IIA
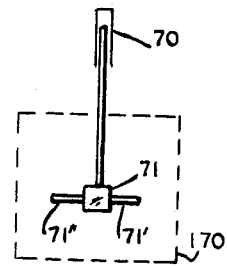
CHAS. GLEN FRANKS
*INVENTOR.*
BY
*Ely Silverman*
ATTORNEY April 28, 1964
C. G. FRANKS
3,130,947
EJECTION SEAT CATAPULT
Filed Nov. 30, 1960
5 Sheets-Sheet 3
FIG. III
FIG. IV
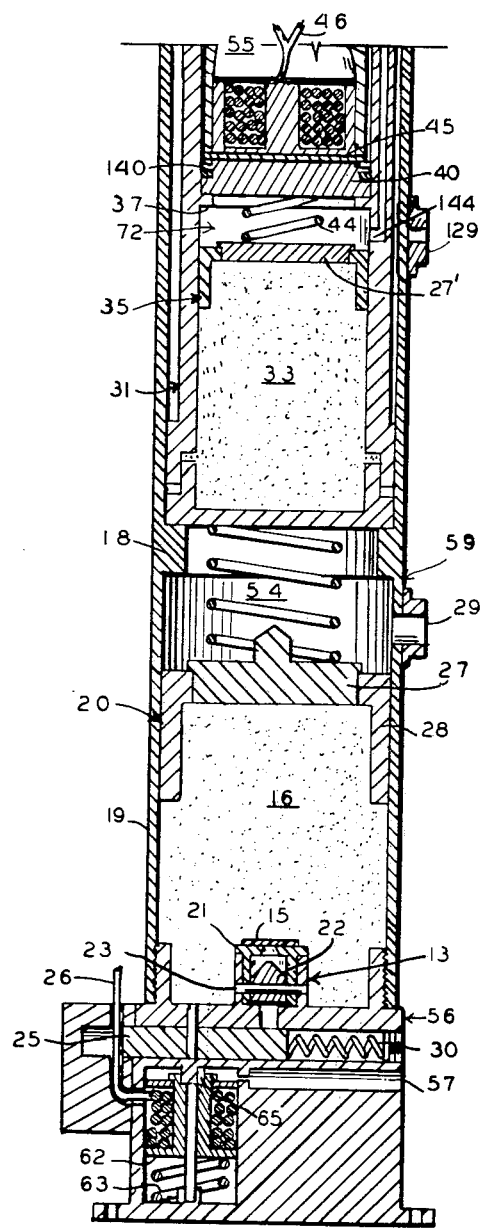
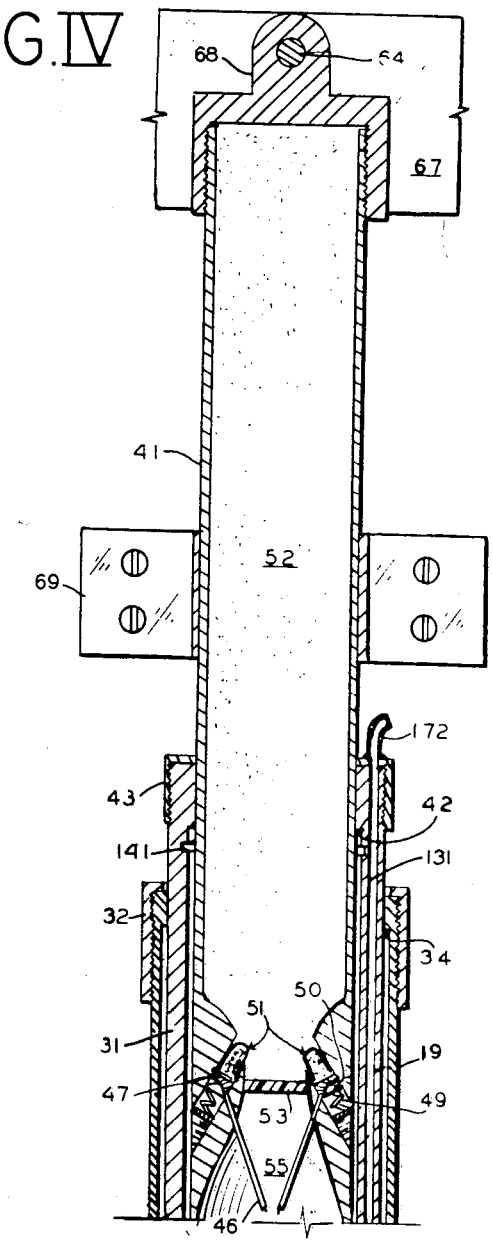
CHAS GLEN FRANKS
INVENTOR.
BY
*Ely Silverman*
ATTORNEY April 28, 1964
C. G. FRANKS
3,130,947
EJECTION SEAT CATAPULT
Filed Nov. 30, 1960
5 Sheets-Sheet 4
FIG. V
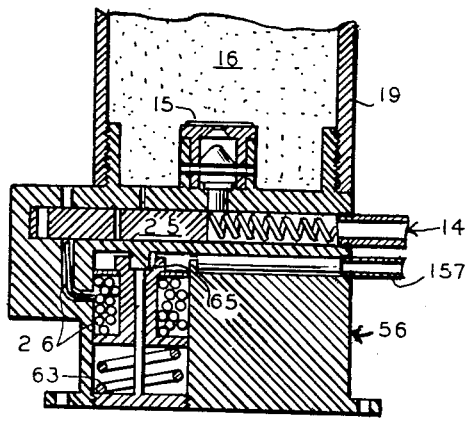
FIG. VIII
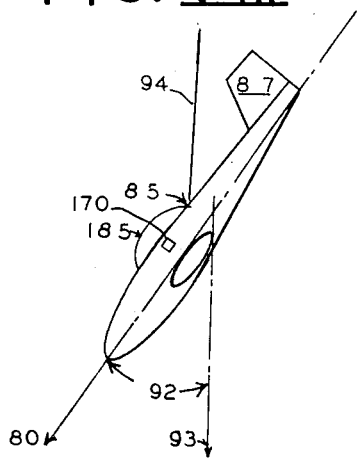
FIG. VII
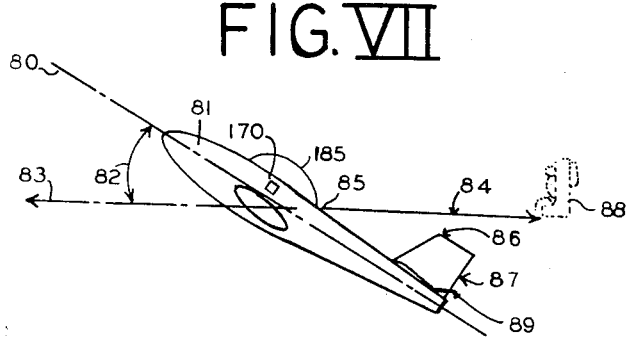
FIG. IX
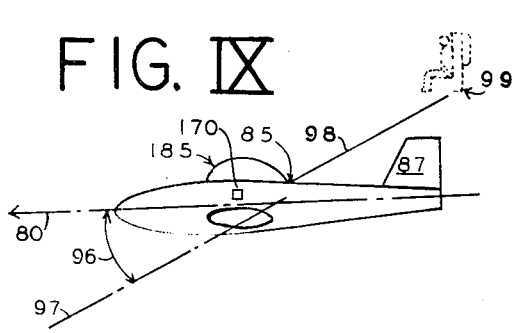
CHAS. GLEN FRANKS
*INVENTOR.*
BY *Ely Silverman*
ATTORNEY

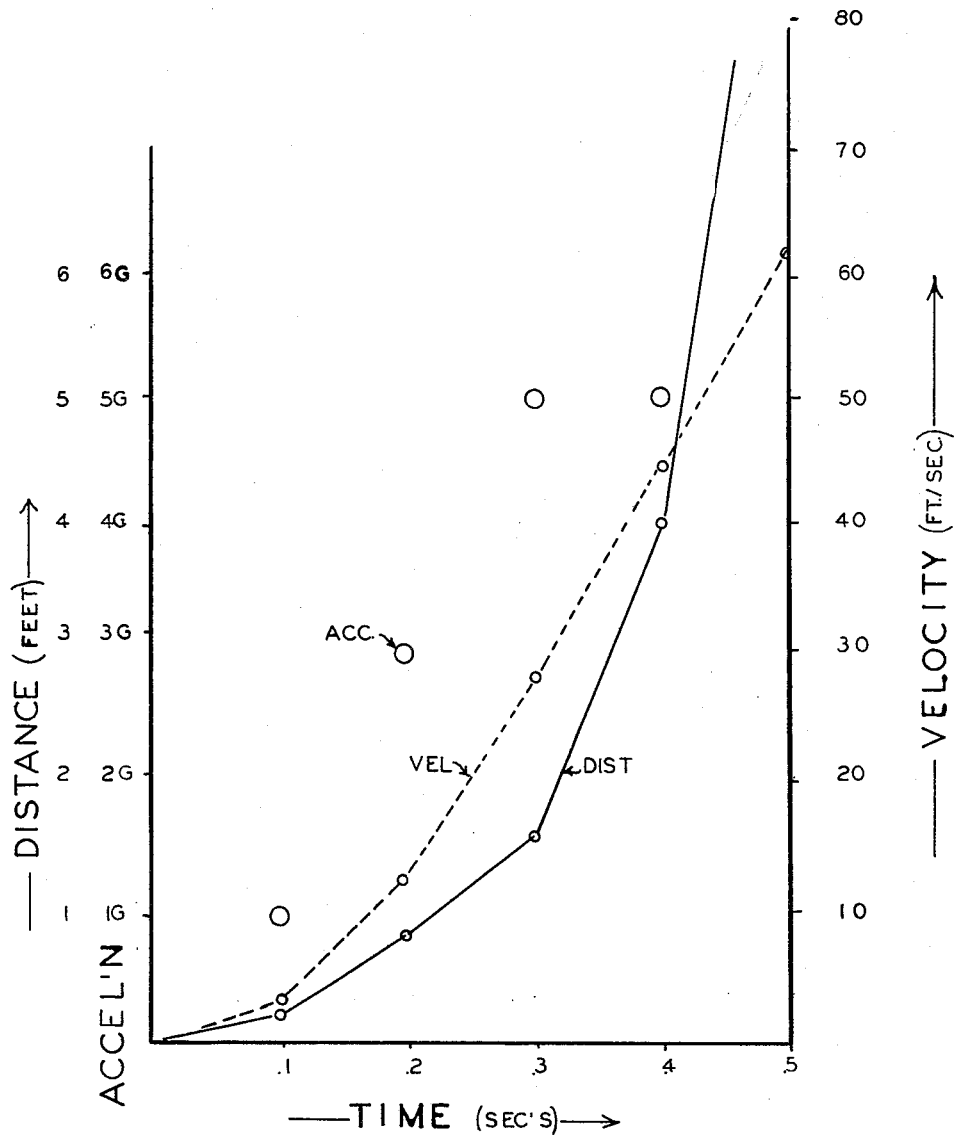

United States Patent Office 3,130,947
Patented Apr. 28, 1964

3,130,947
EJECTION SEAT CATAPULT
Charles Glen Franks, Amarillo, Tex. (Box 255, Skellytown, Tex.), assignor of one-half to Ely Silverman
Filed Nov. 30, 1960, Ser. No. 72,622
8 Claims. (Cl. 244—122)

This invention relates to a safety device—an ejection seat—for aircraft. More particularly, this invention relates to an ejection seat catapult device which, while effectively accomplishing ejection of an airman from an aircraft, reduces the usually extremely high acceleration or "G" forces usually applied to such an airman during ejection from an aircraft.

Accordingly, one object of this invention is to improve the safety of high speed and low level ejections by an improved ejection seat apparatus.

Yet another object of this invention is to provide an ejection apparatus which facilitates removal of an airman from the aircraft in crash rescue situations.

These and other objects will be readily apparent to those skilled in the art by reading of the following description and an examination of the following drawings, which form a part of this specification, and wherein like numerals refer to like parts in the different figures and wherein:

FIGURE I is a side view of the airman's seat with the catapult of this invention attached thereto shown in section along plane 1'—1" of FIGURE II;

FIGURE II is a rear view taken along direction of arrow II' of FIGURE I;

FIGURE 11A is an enlarged view of a zone of FIGURE II;

FIGURES III and IV are, in composite, a diagrammatic cross sectional view along section III'—III" of FIGURE I; FIGURE III is the base section; FIGURE IV is the top section;

FIGURE V shows the disconnector piston in its moved position;

FIGURE VI shows the time-velocity-acceleration relations of the seat using an ejection seat catapult according to one embodiment of this invention;

FIGURE VII is a diagrammatic illustration of one procedure using the device of this invention;

FIGURE VIII is a diagrammatic illustration of another procedure using the device of this invention; and FIGURE IX is a diagrammatic illustration of another procedure using the device of this invention.

The device of this invention comprises a frame comprising rails, as 66, which are vertically movable on slides provided therefor, and said slides are attached to bulkhead 78. The seat 10 is attached to brackets 67 and 69, which brackets are attached to the rocket tube assembly 41. The rocket tube assembly is slidably supported in a secondary combustion tube 31, which in turn seats on a primary combustion tube assembly 19. The primary combustion tube assembly is supported on a catapult base and cable assembly 56. This base is connected to a pneumatic control valve 61 and a catapult initiator 12, as well as an emergency $CO_2$ supply 70.

According to this invention, a low value of acceleration (e.g. 2 G to 3 G) is initially applied to ejectee for the first 0.1 to 0.2 second. A hgher value value of G is subsequently applied the ejectee, as 3 G to 5 G—but not such a high G force, as 20 G for 0.10 second, that might damage the discs in the spine of the ejectee. This protects the spine of the ejectee from damage that might otherwise occur to him on such higher accelerations.

Accordingly, the device of this invention provides for the ejectee an acceleration which gradually increases and thereby permits the spine of the ejectee to gradually absorb the compression resulting therefrom gradually over a finite period of time. In a preferred embodiment of this invention, the ejectee is initially subject to movement by the primary combustion tube assembly so that the ejectee receives an acceleration of 1 G to 3 G for only a very short distance (3 to 6 inches). The distance of the travel of the secondary piston assembly provides for acceleration from 3 G to 5 G in the next 3 to 10 inches. Table I illustrates value of acceleration-velocity-distance relationship on the use of a primary combustion tube assembly which provides a gradually increasing acceleration from 1 G to 3 G followed by acceleration of 3 G to 5 G by the secondary combustion tube. Table II assembly provides a comparable exit velocity by a set of charges that provides an initial 2 G to 4 G followed by 6 G acceleration.

Table I

| Acceleration | Time | s (ft.) | V (ft./sec.) |
|---|---|---|---|
| 1 G | 0–.1 | .16 | 3.2 |
| 3 G | .1–.2 | .80 | 12.8 |
| 5 G | .2–.3 | 1.6 | 28.8 |
| 5 G | .3–.4 | 4.0 | 44.8 |
| 5 G | .4–.5 | 11.2 | 60.8 |

Table II

| Acceleration | Time | s (ft.) | V (ft./sec.) |
|---|---|---|---|
| 2 G | 0–.1 | .32 | 6.4 |
| 4 G | .1–.2 | .96 | 19.2 |
| 5 G | .2–.3 | 1.70 | 35.2 |
| 6 G | .3–.4 | 5.66 | 51 |

The data of Table I is plotted n FIGURE VI.

The exact acceleration needed depends on the velocity required for the ejectee to clear the tail assembly of the aircraft. The combustion of elements provided hereinbelow which serve, as in Table I to give the ejectee a velocity of 44.8 ft./second, will serve to clear by about 2½ feet a tail assembly five feet high which is 20 feet to the rear of the point of ejection of the seat as in a standard T–33 trainer; while a velocity of 51 feet/second (as in table II) will provide a tail clearance of 3½ feet when the plane is similarly traveling with an air speed of 600 m.p.h., assuming a wind blast pressure of 900 lbs. per sq. ft., and the plane is in level flight. The amount of the charges in the primary and secondary combustion tube assemblies for each given total weight of airman and seat (about 400 pounds) may be proportioned by methods well known to those skilled in the art (c.f. Smith, Inorganic Chemistry, 1937, Appleton Century, New York, page 654) to achieve such accelerations and final desired velocity in view of the flight and structure characteristics of the aircraft. One aspect of the invention in this device lies in providing an apparatus that not only permits the initial acceleraton of the seat and airman to be substantially less than the later acceleration but also does this while keeping the maximum acceleration effect at any time at below a level of acceleration which might cause spinal damage or unconsciousness concomitant on such treatment. The levels of human tolerance to acceleration are given at page 262 of Modern Airmanship by N. D. Van Sickle, published 1957 by D. Van Nostrand Co. (Library of Congress card 57–8148). There the average man's time limit of consciousnes under acceleration is shown as varying linearly from .001 second at 70 G to 3½ second at 3½ G, with time and aecleration on logarithmic scale, and the ejectee moved upward from a sitting posture.

In order to effect ejectments that are effective to pass the pilot and seat over the tail assembly of a plane in level flight at air speeds in excess of 600 m.p.h. higher accelerations and exit velocities may be used in the manner above described and using the apparatus of this invention. The absolute value of such accelerations and the time during which the ejectee is subjected thereto, and the change of acceleration provided by the apparatus of this invention serve to not only produce adequate velocities to provide safe ejection at such higher velocities but also do so while using acceleration values that increase at gradual rates which do not damage the ejectee as do those rates of positive accelerations that produce unconsciousness in the ejectee in the sitting posture. Thus, for instance, according to and within the scope of my invention rates of acceleration above given may be doubled, i.e. to about 10 G, achieved by gradual increases of rates of accelerations for safe ejection at 1,000 m.p.h. airspeed from aircraft in level flight.

However, as above discussed, the device of this invention preferably permits gradually increasing acceleration forces up to only 6 G which is well below the limit of tolerance of an average airman as well as adequate for safe ejectment at level flight at 600 m.p.h. The same apparatus, as below described, with the same gradually achieved ejection velocity (about 50 ft./sec.) may be used, with procedures below described to provide effective as well as safe ejectment at airspeeds substantially in excess of 600 m.p.h.

Thus, according to one procedure using the apparatus of my invention the acceleration and exit velocity (the velocity of the seat and pilot at the point 85 in FIGURE 7 at which the bottom of the seat 10 separates from the outer surface of the aircraft 81) needed are reduced below those required for ejection to clear the tail assembly when the plane is in level flight. This is especially important when ejection at airspeeds in excess of 600 m.p.h. are desired.

Thus according to my invention as shown in FIGURE 7, this longitudinal axis 80 of the plane 81 is brought to a sufficient angle, as 82, with respect to the direction of the motion 83, of the plane that a line 84, in the direction of the slipstream, which line is parallel to direction 83, from point 85, clears the top 86 of the tail member 87 by about a foot. Accordingly, the ejectee will be safely carried from the point where the bottom of seat 10 is at point 85 past the upright tail member as shown in dotted lines at 88. When the plane is initially in level flight the aircraft elevators 89 are adjusted to lift the nose of the plane as in FIGURE 7 in order to effect the above-described relation of line of slipstream relative to the top of the upright tail member in the central plane of the aircraft prior to actuation of the device hereinbelow described.

Alternatively, the plane may be dived as shown in FIGURE 8 or the plane may be glided as in FIGURE 9 to effect the same relationship as above described of slipstream past the point 85 to the top 86 of the tail member 87. In FIGURE 8 the axis 80 of the plane 81 is tilted at angle 92 to downward path of motion 93 of the aircraft. Thus the path of travel of the lowermost part of the ejectee will be, as in line 94, clear of the tail member 87. Also, according to the process using the apparatus of this invention, the plane may be glided as shown in FIGURE 9, whereupon the axis 81 of the plane 80 is brought to an angle 96 with respect to the sloped direction of motion 97 of the aircraft, and ejectee, following path of slipstream is carried past point 85 to clear highest point 86 on tail member 87, as shown at point 99. At least these relationships are usually, in the circumstances for which use of the apparatus below-described is intended, readily effected by the pilot of the aircraft from which ejectment is necessary. Thus, according to the invention herein, a device is provided for adequate yet gradually increasing acceleration to achieve an adequate exit velocity for a safe ejectment without such acceleration as damages the ejectee's spinal elements.

In single engine jet airplane where the path of the jet engine stream is in the line of the ariplane axis 80, the angle 82 is to be adjusted so that the ejectee does not come into contact therewith. The lanyard 46 is provided with such a length as to start the operation of rocket tube assembly 41 when seat 10 is above tail assembly, although the rocket is primarily for low level ejection rather than to clear tail sections.

As will be detailed below, the spring 44 above secondary piston plug 27 and in chamber 54 provide for minimizing of jars and a smoothing action between the different acceleration actions applied to the seat 10. Further, a spring attachment, may, at bolt 64 connect the mounting cap 68 to the seat 10, so as to further provide for softening the instantaneous shocks applied to the seat by the combustion mechanisms.

The ejection seat catapult device of this invention, hereinafter referred to as the pneu-rocket multi-purpose catapult is a new approach to the problem of high speed and low level ejections with the addition of a pneumatic system to be used for normal seat adjustments and the raising of the seat to canopy sill level in crash rescue cases. In this catapult the momentum producing charges are split up into a total of three parts: the primary and secondary ballistic charges (which enable the ejecting flyer to clear the tail section of the plane with less G forces acting any instant upon him than is possible with a single charge firing type catapult) and a rocket tube which is placed in series with the ballistic charges and which not only acts in the production of the momentum but is adapted to continue and increase it until sufficient altitude can be reached by the ejecting flyer to allow a safe ground level ejection. This ground level ejection capability is very valuable since a great portion of aircraft accidents take place at low altitude during the processes of take-off and landing. The pneumatic portion eliminates the need for a separate seat adjusting mechanism and reduces greatly the size of the rescue squad in cases of accidents. With this catapult the smaller rescue squad can effect a rescue in approximately one half the time required by older techniques.

The initial acceleration of the ejection seat and flyer is brought about by the ignition of the primary ballistic charge. This forces the primary combustion tube assembly to strike the cylinder head of the secondary combustion tube and, thus, by a crimping and compressive action thereon ignites the secondary ballistic charge. The igniting of the secondary ballistic charge absorbs only a small amount of the momentum produced by the primary charge.

The secondary charge serves to provide the needed acceleration otherwise caused by the reduction of the size of the primary charge necessary to reduce the initial instaneous "G" forces acting upon the flyer, and to replace the lost momentum caused by the ignition of its own charge.

According to this invention the hot gasses of combustion from the primary and secondary ballistic charges remain sealed in their respective combustion tubes during the initial stage of travel of the ejection seat which clears the seat from the aircraft, whereby such gasses cannot cause the ignition of fuel fumes. This retention of the hot gasses of combustion and the time delay on the rocket make this catapult ideal for use on tanker type aircraft. The rocket tube is not ignited until after the ejection seat has left the plane thus eliminating the chance of igniting the fuel fumes which are likely to be present in an emergency situation requiring ejection. The rocket tube provides the additional thrust needed for gaining a peak of trajectory high enough to allow sufficient time for the parachute to bring the airman down safely in case of low level crashes as well as to clear the craft during high level ejections. This can be done without the use of the conventional half second time delay device on the parachute mechanism and is desirable since it reduces the time that the crewman is exposed to the extreme altitude temperatures.

The pneu-rocket multi-purpose catapult is useful in the field of crash rescue because it makes possible a great reduction in the time and the number of men required to effect a successful rescue. This reduction in time comes about as a result of the use of a high pressure $CO_2$ charge in assembly 19 to force an extension of the cylinders in the catapult to lift an incapacitated airman to the canopy sill level, thus eliminating the time consuming motions of getting into position to lift him manually. A control valve mounted next to the canopy actuating cable on the left side of the fuselage releases the pressure stored in the carbon dioxide bottle. This usage of the catapult structure to lift the crewman reduces the manpower needed to effect the rescue. Also, the time required for rescue using this device would be about ten seconds or less compared to a minimum of forty for the older system available.

With the device of this invention, all crew compartments of the downed plane could be worked at the same time, whereas only two at a time could be worked with the old system due to the limited space in the O–11 fire truck, which is in standard use for such operations, since its top serves as a very good platform to work form. Using the pneu-rocket multi-purpose catapult of this invention for crash rescue means that for a plane carrying a three-men crew, a saving of fifty per centum in the number of men in the rescue squad could be expected. Comparable improved efficiencies could be expected on other aircraft, especially those of the multiple seat variety. Further still, the use of the catapult of this invention to lift the injured flyer as above described results in a drastic reduction in the amount of roughing up that the flyer would otherwise have to undergo during an undertaking of this type. It is obvious that the flyer will have a better chance of recovery if his injuries are not aggravated during the rescue operation.

As this catapult is very close to the size of the present catapults as far as external dimensions are concerned, it can, therefore, be easily fitted to existing aircraft with very little expense or effort. This makes it attractive from the economics standpoint.

This catapult may also readily be adapted to executive type transports. Since less energy would be needed for clearing the tail section of such plane than in large and high speed military craft the size of the ballistic charges in these latter situations may be reduced, although a longer burning rocket would be then needed to gain sufficient altitude for a safe ground level ejection. This feature is additional to that the catapult is designed primarily for military use.

As the catapult now stands there is no need for a separate seat adjusting mechanism; pneumatic pressure from assembly 61 in conjunction with the catapult base and cable assembly will effectively perform this function. This elimination of the separate adjusting mechanism brings about a weight savings as well as a reduction in maintenance problems.

The cable system below described in detail used to prevent elongation of the catapult in inverted flight is automatically disconnected with the catapult initiator is fired. A piston, which acts to cut the retainer cable also prevents the firing of the primary charge and so provide effective means for insuring that the proper sequence of operating the two is used. The retainer cable due to its connecting arrangement, below described in detail, does not interfere with the seat adjusting mechanism.

The catapult is set into motion when the flyer in seat 10 squeezes the trigger on the ejection seat handle 11, thereby firing the initiator 12, which actuates the primary firing system assembly 13. The pressure released into the initiator hoses 14 when the initiator is fired forces a horizontal movement of the disconnector piston 25, this movement cuts the extension control cable 26, and clears the way for the initiator hose pressure to act on the primary firing plug 22. The primary coil spring 30 urges and holds the disconnector piston 25 in a position which prevents leakage of combustion gasses when the primary charge is ignited. The primary firing plug also performs the same function in a different location. When the initiator gasses strike the primary firing plug the shear pin 23 is severed allowing the primary firing plug to strike the top of the primary firing cylinder 21, which ignites the primary ballistic charge. A thin but strong membrane 15, across the opening of the primary firing cylinder 21, prevents the primary ballistic powder charge 16 from being packed against the primary firing plug 22, which could cause the plug to have insufficient impact when striking the firing cylinder. When the primary firing plug strikes the primary firing cylinder the primary ballistic charge 16 is ignited causing the primary piston assembly 20 to travel upward until it strikes the ridge 18 on the primary combustion tube assembly 19, whereupon the primary piston plug 27 separates from the primary piston 28, urged by the pressure therebehind and leaving the primary piston in a position to seal the outlet in the pneumatic inlet nut 29. The movement and energy of the primary piston plug on its separation from the primary piston causes the secondary combustion tube assembly 31 to accelerate and move upward towards the primary combustion tube cylinder head 32. The exposively forceful impact of this striking by plug 27 on the bottom portion of the secondary piston assembly then contacted and moved by the plug 27 and the limited portion of the charge 33 in contact therewith, by a crimping action thereon, ignites the secondary ballistic charge 33, whereupon the secondary piston assembly 35 accelerates upward until it comes in contact with the ridge 37 on the secondary combustion tube assembly. Upon striking the ridge mentioned above the secondary piston plug 27' separates from the secondary piston allowing the combustion gasses to act upon the secondary thruster piston 40. As with the primary piston, secondary thruster piston stays in a position which seals in the combustion gasses. The action of the combustion gasses forces the secondary thruster piston to accelerate with respect to the secondary combustion tube assembly. Since the rocket tube assembly 41 is supported on the secondary thruster piston it is also set in motion upon the ignition of the secondary ballistic charge 33. This upward movement of piston 40 continues until the secondary thruster piston strikes inwardly directed ridge 42 on secondary combustion tube cylinder head 43, whereupon the shear pin 45 is severed. When the shear pin is severed the rocket firing system lanyard 46, attached to, wound on and carried by piston 40 unwinds therefrom; when fully extended it pulls the compression holding plugs 47, from their positions and releases the compressed firing plug spring 49 to cause the firing plugs 50 to strike the ballistic cartridges 51, an igniter. The firing of the ballistic cartridges creates sufficient temperature and pressure to ignite the rocket fuel 52. The ignition of the rocket fuel blows the fuel retainer plug 53 from the nozzle 55, allowing the rocket motor to produce the needed thrust to eject the seat to sufficient height to allow a low-level, high speed ejection that is reliable and of minimum danger to the ejected airman. All parts of the catapult system remain with the plane except part of the extension control cable and the rocket tube assembly 41, which leave with the ejection seat.

The pneumatic portion 59 of the catapult of this invention is tied into the aircraft's pneumatic supply 60, as well as the emergency $CO_2$ bottle usually mounted in the side of the plane. Under normal operation the plane's supply is used. A control valve 61 in the ejection seat is used to route the pressures to the proper portions of the catapult. To adjust the seat, pressure is routed to the pneumatic chamber 54, pneumatic inlet 29, in the catapult base, and cable assembly 56. This pressure is also routed to chamber 57 to depress the piston reel 62 to a point past the spline 65 on the catapult base and cable assembly 56. When the piston reel is so depressed, it is free to rotate in either direction depending on increase or decrease of pressure in the pneumatic chamber 54 of the primary combustion tube assembly 19. A pressure increase in the abovementioned chamber raises the seat 10 through upward action on the secondary combustion tube assembly 31. This raising of the seat unreels some of the extension control cable 26, and at the same time winds the main spring 63, so sufficient tension will be available when the seat is lowered to rewind the abovementioned cable. When the pressure is released on the piston reel, the main spring decompresses and forces the reel to slip back on the shaft until it meshes with the downwardly projecting spline 65. The restriction (as shown in FIG. III) between chamber 57 and reel 62 provides on lowering of the seat for slow bleeding of air into chamber 57 and that rewinding of the reel 62 occurs before the main spring fully decompresses and forces the reel to mesh with the downwardly projecting spline and, thereby, avoids generation of slack in line 26. When the piston reel is meshed with that spline, it is not free to rotate; the catapult seat is then in a locked position. Thus, the cable 26 controls the extent to which the seat 10 can move in the upward direction while air pressure in the catapult chamber 54 prevents it from lowering accidentally.

The extension control cable 26 is fastened to (via bolt 64, which passes through) the upper mounting bracket 67 of the seat 10 and the rocket mounting cap 68. As shown at 171' and at 171", check valves are placed in all pneumatic lines to prevent unwanted intermingling of the normal and emergency systems.

The pneumatic portions of the catapult may, also, be operated from a $CO_2$ bottle 70, mounted in the fuselage of the aircraft. The control valve 71 for such emergency operation is mounted in the external canopy jettison well 170 so as to be readily accessible. This emergency system operates to lift the seat 10 via pressure in chamber 54, much the same as the normal with the following exceptions: (1) pressure is, also, applied to the upper pressure chamber 72 located in the secondary combustion tube assembly 31; and, (2) the catapult is, thus, fully extended by secondary thruster piston 40 moving up to the level of secondary combustion tube cylinder head 43. The piston rings 140, on thruster piston 40, then decompress into the groove 141 in tube 31; this locks the seat 10 in an extended position so as to provide a reliable working platform.

As is shown in the drawing of the ejection seat 10, in position in the aircraft, a bolt 64 is passed through the hole placed in the rocket mounting cap 68, and also through the upper mounting bracket 67 of the seat 10. The upper mounting bracket of the seat is fastened to the structural members of the seat 10.

The lower rocket mounting bracket 69 is used for fixing the position of the rocket relative to seat 10. It does not demand the structural integrity of the upper mounting bracket of the seat since there is only a small amount of force acting in this point.

The catapult is fastened to the plane by bolting the catapult base and cable assembly 56, to the relatively heavy plate, 75, joining the lower portions of the I-beam seat rails 66 and 66'. This plate sets the proper angle for mounting the catapult. The fastening of the catapult to this plate rigidly insures the proper relation of the moving portions attached thereto and serves to hold the seat in place during inverted flight. Wheels, as 90, ride in flanges of I-beam rails 66 and 66', and are held to seat 10, by brackets, as 91 and 91': these wheels facilitate movement of the seat with respect to the rails, and, because of the firm fit of said wheels in said flanges avoid rattling. These may have pneumatic rims.

It will be noted that the absolute value of distance required to move the top of cushion 110 to reach level of sill of canopy 185 is taken care of by that such distance is the amount of the extension of the cap 68 permitted the pneumatic lifting arrangement above-described.

Also, the mechanical actuation of the separate propulsion charges may be supplemented by a conventional time delay electrical system (c.f. Coyne Electrical School, Chicago, "Electronics," 1945, pages 229 to 246) for actuation of the propulsion charges in proper sequence. Control valve 61 may be actuated by a release button, as 161, to utilize the air supply 60 of the plane to energize the catapult of this invention. The particular routing of pneumatic pressure from plane supply 60 (or $CO_2$ supply 70) to chamber 57 is above-shown as simultaneously effected via lines 429 and 157; other similarly functionally cooperating connections could also be used. A valve inlet, as 129, may be used in place of the passage 131 in tube 31 leading to chamber 72 via orifice 144. However, orifice 144 is well sealed by piston 35; hence a substitute therefore, as 129, requires a strong enough check valve to withstand the pressures exerted by combustion gases from charge 33. Hence, while the use of an auxiliary inlet 129 is within the scope of this invention the use of lines 172, 131 as shown is preferred.

Having thus described a particular embodiment of my invention, some variations thereof within the scope of my invention will be apparent to those skilled in the art, and accordingly, the scope of this invention is intended to be limited only by the scope of the appended claims.

I claim:

1. In an airplane with an ejectable seat for an airman therein, said airplane having a canopy over the seat, a system for ejecting the seat from the airplane in cooperative combination with a system for raising the seat to the level of the canopy, said system for ejecting comprising
    (a) an outside container having an opening at its top, the bottom of said container being attached to the airplane,
    (b) a tubular container within said outside container containing a propulsive charge, said inner container being axially slidably movable in said outside container and said inner container projecting from the top of said outside container through said opening and being attached to the seat,
    (c) an enclosed space between the bottom of said inner tubular container and a propulsive charge therebelow, and
    (d) controllable means for applying gas pressure in said space and connected thereto thereby to controllably move said inner tubular container upward a predetermined amount to raise said seat to the level of the sill of said canopy without firing any of said propulsive charges.

2. In an airplane with an ejection seat for an airman therein said airplane having a canopy located over the seat, an ejection apparatus for ejecting the seat from the airplane in cooperative combination with an escape apparatus for raising the seat to the level of the canopy, said ejection apparatus comprising
    (a) an outside container with an opening at its top, the bottom of said outside container being attached to the airplane,
    (b) a series of inner tubular containers within said outside container, each containing a separate propulsive charge, said charges being arranged to be sequentially fired, said inner containers being axially slidably movable in said outside container, the terminal tubular container of said series projecting from the top of said outside container through said opening and being attached to the seat,
    (c) an enclosed space between the top of one inner container and the bottom of an adjacent inner container, and
    (d) controllable means for applying gas pressure in said enclosed space and operatively connected thereto thereby to controllably move said terminal tubular container upward a predetermined amount to raise seat to the level of a sill of said canopy without firing any of said propulsive charges.

3. An apparatus as in claim 2 wherein at least one of said inner containers movable in the outside container and below the terminal container also provides a gas-tight fit with the interior of the outside container, and means on the outside container prevent escape of said one inner container from said outside container whereby the combustion gases formed by the propulsive charges of each of the inner containers below the terminal container are maintained within said outside container and means attached to said terminal container and said airplane which actuate the propulsive charge in said terminal container after said terminal container and seat have been ejected from said airplane.

4. Apparatus as in claim 2 wherein the terminal tubular container is held in toward said outside container by cable means which are attached to said outside container and which are released by application of gas pressure thereto concurrently with the application of gas pressure to said enclosed space.

5. Apparatus as in claim 3 wherein the propulsive charges in each of the inner containers are initiated in sequence, each charge in the sequence being larger than the preceeding.

6. Apparatus as in claim 5 wherein acceleration of 2 G to 3 G is applied to the ejected seat and airman for 0.1 to 0.2 seconds, and, thereafter a higher value of G is applied, said higher G value being less than 20 G for a definite period less than 0.10 second.

7. Apparatus as in claim 5 wherein one propulsive charge in one inner container of the series is mechanically actuated by impact from a prior propulsive charge in the series.

8. Apparatus as in claim 2 wherein the said airplane has an external canopy jettison well and the means for applying gas pressure to said enclosed space is controlled by a valve located in said external well.

References Cited in the file of this patent

UNITED STATES PATENTS

| | | |
|---|---|---|
| 2,702,677 | Replogle | Feb. 22, 1955 |
| 2,726,831 | Bleck et al. | Dec. 13, 1955 |
| 2,755,042 | Poddon | July 17, 1956 |
| 2,900,150 | Hirt et al. | Aug. 18, 1959 |